United States Patent [19]

Zwiener et al.

[11] Patent Number: 5,236,741

[45] Date of Patent: * Aug. 17, 1993

[54] PROCESS FOR THE PRODUCTION OF POLYURETHANE COATINGS

[75] Inventors: Christian Zwiener; Josef Pedain, both of Cologne; Lothar Kahl, Gladbach; Klaus Nachtkamp, Duesseldorf, all of Fed. Rep. of Germany

[73] Assignee: Bayer Aktiengesellschaft, Leverkusen, Fed. Rep. of Germany

[*] Notice: The portion of the term of this patent subsequent to Jun. 30, 2009 has been disclaimed.

[21] Appl. No.: 877,682

[22] Filed: May 1, 1992

Related U.S. Application Data

[63] Continuation of Ser. No. 540,536, Jun. 19, 1990, Pat. No. 5,126,170.

[30] Foreign Application Priority Data

Jun. 23, 1989 [DE] Fed. Rep. of Germany ....... 3920574

[51] Int. Cl.$^5$ ............................................. B05D 3/02
[52] U.S. Cl. ............................... 427/385.5; 427/388.2; 525/131; 528/68
[58] Field of Search .................. 427/385.5, 388.2; 528/68; 525/131

[56] References Cited

U.S. PATENT DOCUMENTS

| | | | |
|---|---|---|---|
| 3,639,418 | 2/1972 | Merten | 260/309.5 |
| 3,814,776 | 6/1974 | Fischer et al. | 260/309.5 |
| 4,169,931 | 10/1979 | Rottmaier et al. | 528/49 |
| 4,412,033 | 10/1983 | LaBello et al. | 427/388.2 X |

FOREIGN PATENT DOCUMENTS 2158945 11/1971 Fed. Rep. of Germany .

*Primary Examiner*—Michael Lusignan
*Attorney, Agent, or Firm*—Joseph C. Gil; Thomas W. Roy

[57] ABSTRACT

The present invention relates to a process for the preparation of a polyurethane coating by coating a substrate with a coating composition containing
a) a polyisocyanate component and
b) an isocyanate-reactive component containing at least one compound corresponding to the formula

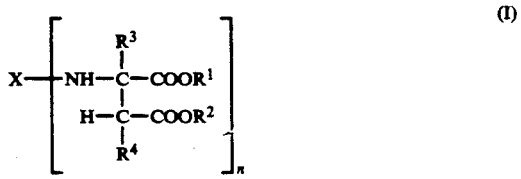

wherein
X represents an organic group which has a valency of n and is inert towards isocyanate groups at a temperature of 100° C. or less,
$R^1$ and $R^2$ may be identical or different and represent organic groups which are inert towards isocyanate groups at a temperature of 100° C. or less,
$R^3$ and $R^4$ may be identical or different and represent hydrogen or organic groups which are inert towards isocyanate groups at a temperature of 100° C. or less and
n represents an integer with a value of at least 2, and curing the coating composition at a temperature of 100° C. or less.

10 Claims, No Drawings

PROCESS FOR THE PRODUCTION OF POLYURETHANE COATINGS

This application is a continuation of application Ser. No. 07/540,536 filed Jun. 19, 1990, now U.S. Pat. No. 5,126,170.

BACKGROUND OF THE INVENTION

1. Field of the Invention

This invention relates to a new process for producing coatings on any substrate by means of a coating composition containing, as binder, a two-component system of a polyisocyanate component and a special isocyanate reactive component.

2. Description of the Prior Art

Two-component coating compositions containing, as binder, a polyisocyanate component in combination with an isocyanate-reactive component, in particular a polyhydroxyl component, are known. They are suitable for the formation of high quality coatings and can be adjusted to produce coatings which are hard, elastic, abrasion resistant and solvent resistant and especially weather resistant.

In accordance with the present invention coating compositions are used in which the binders are based on a two-component system of a polyisocyanate component and an isocyanate-reactive component containing partly or entirely certain secondary polyamines to be described hereinafter. The basic chemical reaction between polyisocyanates and secondary polyamines as used in accordance with the invention is already known from German Offenlegungsschrift 670 812 (=British patent I 190 342), however, according to the teaching of this prior publication said basic reaction is accompanied or immediately followed by a ring forming secondary reaction leading to hydantoins and is, therefore, not used or recommended as hardening reaction for a two-component coating composition.

The systems used in the process according to the invention provide numerous advantages. They are suitable in particular as binders in low solvent or solvent-free coating compositions and enable the coatings to harden rapidly by a chemical cross-linking reaction which takes place at a temperature of at the most 100° C.

SUMMARY OF THE INVENTION

The present invention relates to a process for the preparation of a polyurethane coating by coating a substrate with a coating composition containing a) a polyisocyanate component and
b) an isocyanate-reactive component containing at least one compound corresponding to the formula

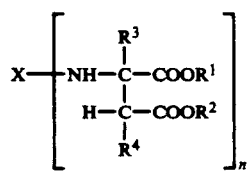

(I)

wherein
X represents an organic group which has a valency of n and is inert towards isocyanate groups at a temperature of 100° C. or less, $R^1$ and $R^2$ may be identical or different and represent organic groups which are inert towards isocyanate groups at a temperature of 100° C. or less, $R^3$ and $R^4$ may be identical or different and represent hydrogen or organic groups which are inert towards isocyanate groups at a temperature of 100° C. or less and n represents an integer with a value of at least 2, and curing the coating composition at a temperature of 100° C. or less.

DETAILED DESCRIPTION OF THE INVENTION

The cross-linking which takes place in the process according to the present invention is based on an addition reaction between polyisocyanate component a) and isocyanate-reactive component b), in particular the polyamines containing secondary amino groups, which are also known as "polyaspartic acid derivatives." This reaction is known in principle from DE-OS 2 158 945 but according to the teachings of this prior publication the reaction is not used for crosslinking two-component coating compounds on the coated substrate at relatively low temperatures but rather for the preparation of intermediate products which are converted at elevated temperatures into the heterocyclic end products of this prior publication. According to the teachings of this prior publication, it is only the conversion of the intermediate products into the heterocyclic end products which takes place on the coated substrate during formation of the coating. The idea of using the spontaneous reaction between isocyanate groups and secondary amino groups as the main reaction for curing a two-component coating composition on the substrate and the possibility of producing high quality coatings by means of this addition reaction are not suggested by this prior publication. In this respect there is no fundamental difference between DE-OS 2,158,945 and DE-OS 1,670,813 which relates to hydantoins.

Suitable polyisocyanates for use as polyisocyanate component a) in accordance with the present invention include the known polyisocyanates of polyurethane chemistry. Examples of suitable low molecular weight polyisocyanates having a molecular weight of 168 to 300 include hexamethylene diisocyanate, 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethy-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained in known manner by the phosgenation of aniline/formaldehyde condensates, 2,4-and/or 2,6-diisocyanatotoluene and any mixtures of these compounds.

It is preferred, however, to use derivatives of these monomeric polyisocyanates, as is conventional in coatings technology. These derivatives include polyisocyanates containing biuret groups as described, for example, in U.S. Pat. No. 3,124,605, U.S. Pat. No. 3,201,372 and DE-OS 1,101,394; polyisocyanates containing isocyanurate groups as described, for example, in U.S. Pat. No. 3,001,973, DE-PS 1,022,789, 1,222,067 and 1,027,394 and DE-OS 1,929,034 and 2,004,048; polyisocyanates containing urethane groups as described, for example, in DE-OS 953,012, BE-PS 752,261 and U.S.

Pat. No. 3,394,164 and 3,644,457; polyisocyanates containing carbodiimide groups as described in DE-PS 1,092,007, U.S. Pat. No. 3,152,162 and DE-OS 2,504,400, 2,537,685 and 2,552,350; and polyisocyanates containing allophanate groups as described, for example, in GB-PS 994,890, BE-PS 761,626 and NL-OS 7,102,524.

The modified polyisocyanates are particularly preferred: N,N',N"-tris-(6-isocyanatohexyl)-biuret and mixtures thereof with its higher homologues and N,N',N"-tris-(6-isocyanatohexyl)-isocyanurate and mixtures thereof with its higher homologues containing more than one isocyanurate ring.

Isocyanate group-containing prepolymers and semi-prepolymers based on the monomeric simple or modified polyisocyanates exemplified above and organic polyhydroxyl compounds are also preferred for use as polyisocyanate component a). These prepolymers and semi-prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1, this reaction being optionally followed by distillative removal of any unreacted volatile starting polyisocyanates still present.

The prepolymers and semi-prepolymers may suitably be prepared from low molecular weight polyhydroxyl compounds having a molecular weight of 62 to 299, such as ethylene glycol, propylene glycol, trimethylol propane, 1,6-dihydroxy hexane; low molecular weight, hydroxyl-containing esters of these polyols with dicarboxylic acids of the type exemplified hereinafter; low molecular weight ethoxylation and/or propoxylation products of these polyols; and mixtures of the preceding polyvalent modified or unmodified alcohols.

The prepolymers and semi-prepolymers are, however, preferably prepared from the known relatively high molecular weight polyhydroxyl compounds of polyurethane chemistry which have a molecular weight of 300 to about 8000, preferably about 1000 to 5000, as determined from the functionality and the OH number. These polyhydroxyl compounds have at least two hydroxyl groups per molecule and generally have a hydroxyl group content of about 0.5 to 17% by weight, preferably about 1 to 5% by weight.

Examples of suitable relatively high molecular weight polyhydroxyl compounds which may be used for the preparation of the prepolymers and semi-prepolymers include the polyester polyols based on the previously described low molecular weight, monomeric alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Hydroxyl group-containing polylactones, especially poly-ε-caprolactones, are also suitable for the preparation of the prepolymers and semi-prepolymers.

Polyether polyols, which are obtained in known manner by the alkoxylation of suitable starting molecules, are also suitable for the preparation of the isocyanate group-containing prepolymers and semiprepolymers. Examples of suitable starting molecules for the polyether polyols include the previously described monomeric polyols, water, organic polyamines having at least two NH bonds and any mixtures of these starting molecules. Ethylene oxide and/or propylene oxide are particularly suitable alkylene oxides for the alkoxylation reaction. These alkylene oxides may be introduced into the alkoxylation reaction in any sequence or as a mixture.

Also suitable for the preparation of the prepolymers and semiprepolymers are the hydroxyl group-containing polycarbonates which may be prepared by the reaction of the previously described monomeric diols with phosgene and diaryl carbonates such as diphenyl carbonate.

Component b) is based in whole or in part on compounds corresponding to the formula:

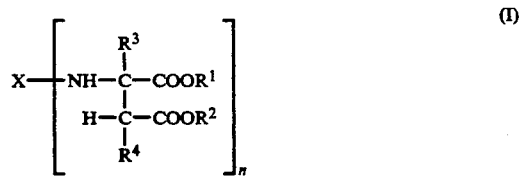

wherein $R^1$ to $R^4$ and n have the meanings previously set forth. It is particularly preferred to use "polyaspartic acid derivatives" corresponding to the above formula wherein X represents a divalent hydrocarbon group obtained by the removal of the amino groups from 1,4-diaminobutane, 1,6-diaminohexane, 2,2,4- and 2,4,4-trimethyl-1,6-diaminohexane, 1-amino-3,3,5-trimethyl-5-aminomethyl-cyclohexane, 4,4'-diamino-dicyclohexyl methane or 3,3-dimethyl-4,4'-diamino-dicyclohexyl methane and n is 2.

The preferred starting components b) also include those compounds corresponding to formula I wherein $R^1$ and $R^2$ represent for methyl or ethyl groups and $R^3$ and $R^4$ represent hydrogen.

These compounds are prepared in known manner by reacting the corresponding primary polyamines corresponding to the formula $$X\text{-}(\text{-NH}_2)_n \qquad (II)$$

with optionally substituted maleic or fumaric acid esters corresponding to the formula $$R^1OOC\text{---}CR^3\!=\!CR^4\text{---}COOR^2 \qquad (III)$$

Suitable polyamines includes ethylene diamine, 1,2-diaminopropane, 1,4-diaminobutane, 1,6-diaminohexane, 2,5-dimethylhexane, 2,2,4-and/or 2,4,4-trimethyl-1,6-diaminohexane, 1,11-diaminoundecane, 1,12-diaminododecane, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dimethyl-4,4'-diamino-dicyclohexyl methane. Aromatic polyamines such as 2,4- and/or 2,6-diaminotoluene and 2,4'- and/or 4,4'-diaminodiphenyl methane are also suitable but less preferred. Relatively high molecular weight polyether polyamines containing aliphatically bound primary amino groups, for example, the products marketed under the Jeffamine trademark by Texaco, are also suitable.

Examples of optionally substituted maleic or fumaric acid esters suitable for use in the preparation of the compounds corresponding to formula I include dimethyl, diethyl and di-n-butyl esters of maleic acid and fumaric acid and the corresponding maleic or fumaric acid esters substituted by methyl in the 2- and/or 3-position.

The preparation of the "polyaspartic acid derivatives" corresponding to formula I from the above mentioned starting materials may be carried out, for example, at a temperature of 0° to 100° C. using the starting materials in such proportions that at least 1, preferably 1, olefinic double bond is present for each primary amino group. Excess starting materials may be removed by distillation after the reaction. The reaction may be carried out solvent-free or in the presence of suitable solvents such as methanol, ethanol, propanol, dioxane and mixtures of such solvents. The binders present in the coating compositions according to the invention are based on mixtures of polyisocyanate component a) with the secondary polyamines corresponding to formula I or mixtures of polyisocyanate component a) with the secondary polyamines and other isocyanate-reactive compounds.

These other optionally used isocyanate-reactive compounds are preferably organic polyhydroxyl compounds known from polyurethane chemistry and include both the low molecular weight polyhydroxyl compounds and the relatively high molecular weight polyhydroxyl compounds previously set forth for the preparation of the prepolymers and semi-prepolymers suitable for use as polyisocyanate component a).

Particularly preferred isocyanate-reactive compounds which may be used as a portion of component b) are the hydroxy functional polyacrylates known for use in polyurethane coatings. These compounds are hydroxyl-containing copolymers of olefinically unsaturated compounds having a number average molecular weight ($M_n$) determined by vapor pressure or membrane osmometry of about 800 to 50,000, preferably about 1000 to 20,000 and more preferably about 5000 to 10,000, and having a hydroxyl group content of about 0.1 to 12% by weight, preferably about 1 to 10% by weight and most preferably about 2 to 6% by weight. The copolymers are based on olefinic monomers containing hydroxyl groups and olefinic monomers which are free from hydroxyl groups. Examples of suitable monomers include vinyl and vinylidene monomers such as styrene, o-methyl styrene, o- and p-chloro styrene, o-, m- and p-methyl styrene, p-tert.-butyl styrene; acrylic acid; (meth)acrylonitrile; acrylic and methacrylic acid esters of alcohols containing 1 to 8 carbon atoms such as ethyl acrylate, methyl acrylate, n- and isopropyl acrylate, n-butyl acrylate, 2-ethylhexyl acrylate, 2-ethylhexyl methacrylate, iso-octyl acrylate, methyl methacrylate, ethyl methacrylate, butyl methacrylate and isooctyl methacrylate; diesters of fumaric acid, itaconic acid or maleic acid having 4 to 8 carbon atoms in the alcohol component; (meth)acrylic acid amide; vinyl esters of alkane monocarboxylic acids having 2 to 5 carbon atoms such as vinyl acetate or vinyl propionate; and hydroxyalkyl esters of acrylic acid or methacrylic acid having 2 to 4 carbon atoms in the hydroxyalkyl group such as 2-hydroxyethyl-, 2-hydroxypropyl-, 4-hydroxybutyl-acrylate and methacrylate and trimethylol propane-mono- or pentaerythritomono-acrylate or methacrylate. Mixtures of the monomers exemplified above may also be used for the preparation of the hydroxy functional polyacrylates.

Mixtures of the polyhydroxyl compounds previously described may be used as a portion of component b).

In the binders used according to the invention, components a) and b) are used in amounts sufficient to provide an equivalent ratio of isocyanate groups to isocyanate-reactive groups of about 0.8:1 to 20:1, preferably about 0.8:1 to 2:1, more preferably about 0.8:1 to 1.2:1 and most preferably about 1:1. The optional polyhydroxyl compound is present in component b) in an amount such that up to 20 hydroxyl groups are present for each secondary amino group from the compounds corresponding to formula I, preferably the equivalent ratio of hydroxyl groups to secondary amino groups is about 10:1 to 1:10.

The binders to be used according to the invention are prepared by mixing the individual components together although if the optional polyhydroxyl compounds may be initially blended with the compounds corresponding to formula I. Preparation of the binders is carried out solvent-free or in the presence of the solvents conventionally used in polyurethane coatings. It is an advantage of the process according to the invention that the quantity of solvent used may be greatly reduced when compared with that required in known two-component systems.

Examples of suitable solvents include xylene, butyl acetate, methyl isobutyl ketone, methoxypropyl acetate, N-methyl pyrrolidone, Solvesso solvent, petroleum hydrocarbons, iso-butanol, butyl glycol, chlorobenzenes and mixtures of such solvents. The alcoholic solvents previously mentioned may be used, provided that the optional polyhydroxyl compounds are not used.

In the coating compositions to be used for the process according to the invention, the ratio by weight of the total quantity of binder components a) and b) to the quantity of solvent is about 40:60 to 100:0, preferably about 60:40 to 90:10.

The coating compositions to be used for the process according to the invention may also contain other auxiliary agents and additives conventionally used in polyurethane coatings, in particular pigments, fillers, levelling agents, catalysts, antisettling agents, and the like.

The properties of the coatings obtained by the process according to the invention may be adjusted, in particular by suitable choice of the nature and proportions of the starting components a) and b). Thus, for example, the presence of relatively high molecular weight, linear polyhydroxyl compounds either in the prepolymers or semiprepolymers of component a) and/or in component b) increases the elasticity of the coatings; whereas, the absence of such starting components increases the crosslinking density and hardness of the resulting coatings.

For carrying out the process according to the invention, the coating compositions to be used according to the invention are applied as one or more layers to substrates by known methods such as spraying, brush coating, immersion or flooding or by means of rollers or doctor applicators. The process according to the invention is suitable for the formation of coatings on any substrates, e.g., metals, plastics, wood or glass. The process according to the invention is particularly suitable for the formation of coatings on sheet steel, for example, for the manufacture of car bodies, machines trim panels, vats or containers. The substrates to be coated by the process according to the invention may be treated with suitable primers before the process according to the invention is carried out.

After the substrates exemplified above have been coated, the coatings are cured by the process according to the invention at a temperature of about −20° to 100° C. Curing is preferably carried out at a temperature about 10° C. to +80° C. by air drying or so-called forced drying. It is of great benefit that the coatings will not thermally degrade even at the higher temperatures which may occur in the event of a breakdown of the coatings plant.

The surface protection obtainable by the process according to the invention is demonstrated in the examples which follow. All percentages given are percentages by weight unless otherwise indicated.

EXAMPLES

The following starting materials were used in the examples:

POLYISOCYANATE I

A commercially-available polyisocyanate produced by trimerizing hexamethylene diisocyanate (90% solution in butyl acetate/solvent naphtha 100 (1:1), NCO content of solution: 19.4%).

POLYISOCYANATE II 50.1% of a commercially-available, solvent-free biuret of hexamethylene diisocyanate having an isocyanate content of 22.0% was reacted with 14.9% of a commercially-available, solvent-free polyester of 43.8% phthalic acid anhydride, 0.4% maleic acid anhydride, 16.9% 1,6-hexanediol, 31.2% dodecahydro-bisphenol A and 7.7% trimethylol propane in 35% of a solvent mixture of solvent naphtha 100/methoxypropylacetate, 4:1, at about 80° C., until the NCO content of the reaction mixture reached about 10.4%.

POLYISOCYANATE III

Commercially-available biuret polyisocyanate based on o hexamethylene diisocyanate (75% solution in methoxypropylacetate/xylene (1:1) having an NCO content in solution of 16.5%).

PRODUCTION OF "POLYASPARTIC ACID ESTER"

A) 170 g 1-amino-3,3,5-trimethyl-5-aminomethyl-cyclohexane (IPDA) were added dropwise and with stirring to 344 g maleic acid diethylester at 30° C. Stirring was continued overnight at room temperature. A colorless, clear product having a viscosity of about 500 mPa.s (23° C.) was obtained.

B) 88 g 1,4-diaminobutane was dissolved in methanol to form a 50% solution and slowly added dropwise and with stirring at room temperature to a 50% solution in methanol of 288 g maleic acid dimethylester. Stirring was continued overnight at room temperature. After removing the solvent a clear product having a viscosity of about 350 mPas (23° C.) and an equivalent weight of about 198 g/NH was obtained.

C) 116 g 1,6-diaminohexane in melt form was added dropwise and with stirring to 344 maleic acid diethylester at room temperature. The reaction was complete after about 6 hours at this temperature. A clear, colorless product having a viscosity of about 100 mPa.s (23° C.) and an equivalent weight of about 233 g/NH was obtained.

D) 238 g 3,3'-dimethyl-4,4'-diamino-dicyclohexylmethane (Laromin C 260, BASF AG) was added dropwise and with stirring to 344 g maleic acid diethyl ester. Stirring was continued overnight at room temperature. A colorless, clear product having a viscosity of about 1,000 mPa.s (23° C.) and an equivalent weight of about 295 g/NH was obtained.

E) 158 g of a mixture of 2,2,4- and 2,4,4-trimethyl-1,6-hexanediamine was added dropwise and with stirring to 344 g maleic acid diethylester at 30° C. Stirring was continued for about 6 hours at room temperature. A clear, colorless product having a viscosity of about 150 mPa.s (23° C.) and an equivalent weight of about 254 g/NH was obtained.

F) 288 g maleic acid diethylester was added dropwise and with stirring to a 50% solution in methanol of 210 g 4,4'-diaminodicyclohexylmethane at 60° C. Stirring was continued for about 8 hours at this temperature. After removing the solvent, a clear product having a viscosity of about 6,500 mPa.s (23° C.) and an equivalent weight of 256 g/NH was obtained.

G) 288 g maleic acid dimethylester was added dropwise and with stirring to a 50% solution in methanol of 238 3,3-dimethyl-4,4'-diamino-dicyclohexylmethane (Laromin C 260, BASF AG) at 60° C. Stirring was continued overnight at this temperature. After the solvent was removed, a clear product having a viscosity of about 3,500 mPa.s (23° C.) and an equivalent weight of about 273 g/NH was obtained.

H) 288 g maleic acid dimethylester was added dropwise and with stirring to a 50% solution in methanol of 170 g isophorondiamine at 60° C. Stirring was continued overnight at this temperature. After the solvent was removed, a clear product having a viscosity of about 3,500 mPa.s (23° C.) and an equivalent weight of 236 g/NH was obtained.

I) 210 g 4,4'-diamino-dicyclohexylmethane was added dropwise and with stirring to 344 g maleic acid diethylester at 30° C. Stirring was continued overnight at room temperature. A clear product having a viscosity of about 1,000 mPa.s (23° C.) and an equivalent weight of about 280 g/NH was obtained.

J) 88 g 1,4-diaminobutane was added dropwise and with stirring to 344 g maleic acid diethylester at room temperature. The reaction was complete after about 6 hours at room temperature. A clear, colorless product having a viscosity of about 100 mPa.s (23° C.) and an equivalent weight of about 223 g/NH was obtained.

K) 62.5 g of a triamine corresponding to the formula was added dropwise within 2 hours and with stirring to 129. g maleic acid diethylester at room temperature. Stirring was continued for 6 hours at 60° C. A clear, almost colorless product having a viscosity of 2,100 mPa.s and an equivalent weight of 277 g was obtained.

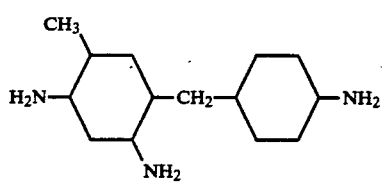

POLYACRYLATE POLYOL I

A commercially available polyacrylate-polyol (Desmophen A 365, Bayer AG) in the form of a 65% solution in butylacetate/xylene (3:1), OH content of the solution: 2.8%.

POLYACRYLATE/POLYESTER POLYOL II

A 75% solution in xylene of a polyol mixture having a hydroxyl group content of 3.92% and containing 42% of a copolymer having a hydroxyl group content of 5.45% and of carboxyl group content of 1.2% and prepared from

| | |
|---|---|
| 38.8% | hydroxylpropylmethacrylate |
| 21.6% | styrene |
| 21.6% | methylmethacrylate |
| 16% | butylacrylate |
| 2% | acrylic acid | and 28% of a polyester polyol having a hydroxyl group content of 4.85% and prepared from

| | |
|---|---|
| 19.5% | 2-ethylhexanoic acid |
| 41.2% | trimethylolpropane |
| 28.5% | hexahydrophthalic acid anhydride |
| 10.8% | adipic acid |

POLYESTER POLYOL III

A polyester polyol having a hydroxyl group content of 4.28% and prepared by reacting

| | |
|---|---|
| 32.9% | trimethylolpropane |
| 10.6% | 2-ethylhexanoic acid |
| 10.6% | benzoic acid |
| 23.8% | hexahydrophthalic acid anhydride |
| 2.1% | maleic acid anhydride |
| 20% | methoxypropylacetate (MPA) |

EXAMPLE 1

216 g polyisocyanate I and 257 g polyaspartic acid ester A were mixed with 91 g of a solvent mixture (MPA/ethyl acetate/butyl acetate/toluene 1:1:1:1). The equivalent ratio of isocyanate groups to secondary amino groups was 1:1. The clear coating composition, which had a run-out time (according to DIN 53 211) of 25 seconds to provide suitable processing, was applied with a doctor blade to a glass plate and dried under the conditions set forth in the Table 1. The resulting film properties are compared in the Table 1 to those of the known coating system described in the following comparison example.

EXAMPLE 2 (COMPARISON EXAMPLE)

216 g polyisocyanate I and 607 g polyacrylate-polyol I were mixed with 355 g of the solvent mixture described in example 1.

The clear coating composition, which had a flow time (according to DIN 53 211) of 25 sec. to provide proper processing, was applied with a doctor blade to a glass plate and dried under the conditions shown in the Table 1.

Table 1 sets forth the film properties compared to those of the claimed process of the invention.

TABLE 1

| | Example 1 | Example 2 |
|---|---|---|
| Outflow time (DIN 53 211) | 25 sec | 25 sec |
| Solids content | 80% | 50% |
| Pot life | 1.8 h | 3.5 h |
| Sand dry time | 1 h | 3 h |
| Touch dry time | 2 h | 4 h |
| Pendulum hardness (DIN 53 157) | | |
| after 1 d at RT | 163 sec. | 70 sec. |
| after 2 d at RT | 168 sec. | 111 sec. |
| after 30 min. at 60° C. | 152 sec. | 72 sec. |
| and 1 d at RT | 200 sec. | 135 sec. |
| and 2 d at RT | 205 sec. | 154 sec. |
| Solvent resistance* | | |
| toluene/MPA/ethyl acetate/acetone | | |
| 1 min after 1 d at RT | 1/1/3/4 | 4/3/4/4 |
| 5 min after 1 d at RT | 2/2/4/4 | 4/3/4/4 |
| 1 min after 2 d at RT | 1/1/2/4 | 2/2/2/4 |
| 5 min after 2 d at RT | 2/2/4/4 | 4/3/4/4 |

*The test consisted of placing a solvent-soaked cotton ball on the coating surface for 1 or 5 minutes (0 = film was unchanged; 5 = film was destroyed).

EXAMPLES 3 to 5

In accordance with the procedure set forth in Example 1, clear coatings were formulated from polyisocyanate I and polyaspartic acid esters F, H and I by maintaining an equivalent ratio of NCO/NH of 1:1. The properties of the coatings applied with doctor blades to tin sheets are set forth in Table 2.

EXAMPLES 6 to 10

The clear coating compositions set forth in Table 3 were formulated from polyisocyanate I and the polyaspartic acid esters B, C, D, E and G.

EXAMPLES 11 to 13

Polyisocyanate II and polyaspartic acid esters B, C and J were mixed at an NCO/OH equivalent ratio of 1:1 and applied in film thicknesses of about 1 mm to glass plates. Clear elastic films were obtained which had the hardnesses set forth in Table 4.

TABLE 2

| | Example 3 | Example 4 | Example 5 |
|---|---|---|---|
| Solids Content | 50% | 50% | 50% |
| Outflow time (DIN 53 211) | 12 sec. | 11 sec. | 12 sec. |
| Pot life | 2.3 h | 1.6 h | 7.0 h |
| Sand dry time | 1.5 h | 1 h | 1 h |
| Touch dry time | 1.5 h | 1.5 h | 2 h |
| Film thickness | 40 μm | 40 μm | 40 μm |
| Pendulum hardness (DIN 53 157) | | | |
| after 1 d at RT | 178 sec. | 181 sec. | 180 sec. |
| after 2 d at RT | 181 sec. | 195 sec. | 180 sec. |
| after 30 min. 60° C. + 1 d RT | 184 sec. | 192 sec. | 187 sec. |
| Solvent resistance | | | |
| Toluene/MPA/ethylacetate/acetone | | | |
| 1 min. after 1 d at RT | 0/0/1/4 | 0/0/1/4 | 0/1/3/4 |
| 5 min. after 1 d at RT | 1/0/3/4 | 1/0/3/4 | 1/1/4/4 |
| 1 min. after 7 d at RT | 0/0/1/3 | 0/0/0/3 | 0/0/1/4 |
| 5 min. after 7 d at RT | 1/0/1/4 | 0/0/2/4 | 1/1/4/4 |
| Erichsen pendulum hardness (DIN 53 156) | | | |
| after 7 d at RT | 7.5 | 8.0 | 8.8 |
| after 30 min. 60° C. + 7 d at RT | 10.0 | 9.5 | 9.5 |

TABLE 3

| Example | Polyaspartic acid ester | Polyisocyanate | NCO/NH equivalent ratio | Solids content | Gel time | Pencil hardness after 1 d at RT | Solvent resistance* after 1 d at RT |
| --- | --- | --- | --- | --- | --- | --- | --- |
| 6 | B | I | 1.0 | 60% | 1 min | H | 0/0/4/4 |
| 7 | C | I | 1.0 | 90% | 1 min | 2 H | 0/0/4/4 |
| 8 | D | I | 1.0 | 90% | 6 h | 2 H | 0/1/4/4 |
| 9 | E | I | 1.0 | 75% | 10 min | H | 1/0/4/4 |
| 10 | G | I | 1.0 | 60% | 10 h | 2 H | 0/1/4/4 |

*The solvent resistance was determined in the manner set forth in Table I (1 minute)

TABLE 4

| Example | Polyaspartic acid ester | Polyisocyanate | NCO/NH equivalent ratio | Solids content | Shore A hardness after 1 d at RT | Shore A hardness after 7 d at RT |
| --- | --- | --- | --- | --- | --- | --- |
| 11 | B | II | 1.0 | 77% | 75 | 80 |
| 12 | C | II | 1.0 | 77% | 75 | 80 |
| 13 | J | II | 1.0 | 77% | 70 | 75 |

The coating compositions of Examples 14 to 21 were applied to glass plates with a doctor blade.

EXAMPLE 14

Polyasparatic acid ester H was mixed with polyacrylate/polyester polyol II at a weight ratio (based on solids content) of 1:1 and cured with polyisocyanate I at an equivalent ratio (NCO/NH+OH) of 1.0:1.0. The solids content was adjusted to 60% with the solvent mixture described in Example 1.

EXAMPLE 15 (COMPARISON EXAMPLE TO EXAMPLE 14)

Polyisocyanate I was mixed with the polyacrylate/polyester polyol II at NCO/OH equivalent ratio of 1.0:1.0 and cured to form a clear coating. The solids content was adjusted to 60% with the solvent mixture described in Example 1.

| | Example 14 | Example 15 |
| --- | --- | --- |
| Solids content | 60% | 60% |
| Outflow time (DIN 53 211) | 15 sec. | 20 sec. |
| Sand dry time | 25 min. | >5 h |
| Touch dry time | 2 h | >6 h |
| Solvent resistance after 7 d at RT | 0/0/4/4 | 3/1/5/5 |

The solvent resistance was determined in the manner set forth in Table 1 (1minute).

EXAMPLE 16

Example 14 was repeated using a coating composition based on polyisocyanate III, polyaspartic acid ester F and polyacrylate/polyester polyol II.

EXAMPLE 17 (COMPARISON EXAMPLE TO EXAMPLE 16)

Example 15 was repeated using a coating composition based on polyisocyanate component III and polyacrylate/polyester polyol II.

| | Example 16 | Example 17 |
| --- | --- | --- |
| Solids content | 60% | 60% |
| Outflow time (DIN 53 211) | 20 sec. | 29 sec. |
| Sand dry time | 25 min. | 7.5 h |
| Touch dry time | 35 min. | 7.5 h |
| Solvent resistance after 3 d at Rt | 1/0/4/4 | 3/3/5/5 |

The solvent resistance was determined in the manner set forth in Table 1(1 minute).

EXAMPLE 18

Polyasparatic acid ester F was mixed with polyester polyol III at a weight ratio (based on solids) of 1:9 and cured with polyisocyanate I at an equivalent ratio (NCO/NH+OH) of 1.0:1.0. The solids content was adjusted as in Example 14.

EXAMPLE 19 (COMPARISON EXAMPLE TO EXAMPLE 18)

Example 15 was repeated with a coating composition based on polyisocyanate I and polyester polyol III.

| | Example 18 | Example 19 |
| --- | --- | --- |
| Solids content | 60% | 60% |
| Outflow time (DIN 53 211) | 15 sec. | 17 sec. |
| Sand dry time | 15 min. | 6 h |
| Touch dry time | 3.5 h | 7 h |
| Pendulum hardness (DIN 52 157) | | |
| after 40 min. 80° C. + 1 d at RT | 175 sec. | 173 sec. |
| after 40 min. 80° C. + 7 d at RT | 176 sec. | 174 sec. |
| Solvent resistance | | |
| after 40 min. 80° C. + 1 d at RT | 0/0/3/3 | 2/1/4/5 |
| after 40 min. 80° C. + 7 d at RT | 0/0/1/5 | 0/1/4/4 |

The solvent resistance was determined in the manner set forth in Table 1 (1minute).

EXAMPLE 20

Polyasparatic acid ester I) was mixed with polyester polyol III at a weight ratio (based on solids) of 9:1 and cured with polyisocyanate I at an equivalent ratio (NCO/NH+OH) of 1.0:1.0. The solids content was adjusted as in Example 14.

EXAMPLE 21 (COMPARISON EXAMPLE TO EXAMPLE 20)

Example 15 was repeated with a coating composition based on polyisocyanate component III and polyester polyol III.

| | Example 20 | Example 21 |
| --- | --- | --- |
| Solids content | 60% | 60% |
| Outflow time (DIN 53 211) | 13 sec. | 17 sec. |
| Sand dry time | 35 min. | 6 h |
| Touch dry time | 50 min. | 7 h |
| Solvent resistance after 1 d at RT | 0/0/4/4 | 1/1/2/5 |

The solvent resistance was determined in the manner set forth in Table 1 (1 minute).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a coating which comprises coating a substrate with a coating composition comprising effective film forming amounts of
   a) a polyisocyanate component and
   b) an isocyanate-reactive component comprising
   i) at least one compound corresponding to the formula

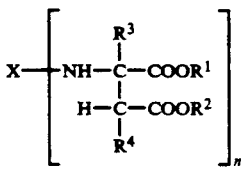

wherein
X represents an organic group which has a valency of n and is inert towards isocyanate groups at a temperature of 100° C., provided that X is not obtained by removing the amino groups from an aromatic polyamine,
R¹ and R² may be identical or different and represent organic groups which are inert towards isocyanate groups at a temperature of 100° C. or less,
R³ and R⁴ represent hydrogen and
n represents 2, and
ii) a polyhydroxyl compound in an amount of up to 20 hydroxy groups for each secondary amino group from component i),
and hardening said composition at a temperature of 10° to 80° C.

2. The process of claim 1 wherein
X represents an organic group obtained by removing the amino groups from ethylene diamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotoluylene diamine, 2,4'- and/or 4,4'-diaminodicyclohexyl methane or 3,3'-dimethy-4,4'-diaminodicyclohexylmethane.

3. The process of claim 1 wherein component b) additionally comprises a copolymer which is prepared from a hydroxyalkyl ester of acrylic acid and/or methacrylic acid and another olefinically unsaturated monomer, has a molecular weight ($M_n$) of about 800 to 50,000 and a hydroxyl group content of about 0.1 to 12% by weight, and is present in an amount sufficient to provide a positive amount of up to 20 hydroxyl groups of said copolymer for each amino group provided by a compound corresponding to formula I.

4. The process of claim 2 wherein component b) additionally comprises a copolymer which is prepared from a hydroxyalkyl ester of acrylic acid and/or methacrylic acid and another olefinically unsaturated monomer, has a molecular weight ($M_n$) of about 800 to 50,000 and a hydroxyl group content of about 0.1 to 12% by weight, and is present in an amount sufficient to provide a positive amount of up to 20 hydroxyl groups of said copolymer for each amino group provided by a compound corresponding to formula I.

5. The process of claim 1 wherein $R^1$ and $R^2$ represent a methyl or ethyl group.

6. The process of claim 2 wherein $R^1$ and $R^2$ represent a methyl or ethyl group.

7. The process of claim 3 wherein $R^1$ and $R^2$ represent a methyl or ethyl group.

8. The process of claim 4 wherein $R^1$ and $R^2$ represent a methyl or ethyl group.

9. The process of claim 1 that the proportions of components a) and b) are calculated to provide an equivalent ratio of isocyanate groups of component a) to isocyanate-reactive groups of component b) of about 0.8:1 to 20:1.

10. The process of claim 1 wherein said coating composition additionally comprises a solvent in an amount sufficient to provide a weight ratio of components a) and b) to solvent of about 60:40 to 90:10.

* * * * *